3,390,143
PROCESS FOR THE PRODUCTION OF VINYLCHLO-
RIDE POLYMERS BY LOW-TEMPERATURE PO-
LYMERIZATION IN THE PRESENCE OF A CERIC
SALT CATALYST AND AN ORGANOMETALLIC
REDUCING AGENT
Carlo Nicora, Varese, and Giancarlo Borsini, Milan, Italy,
assignors to Montecatini Edison S.p.A., Milan, Italy,
No Drawing. Continuation-in-part of application Ser. No.
444,811, Apr. 1, 1965. This application Feb. 16, 1966,
Ser. No. 527,745
Claims priority, application Italy, Feb. 22, 1965,
3,608/65
8 Claims. (Cl. 260—92.8)

ABSTRACT OF THE DISCLOSURE

A process for the production of vinylchloride polymers and copolymers by the polymerization at a temperature between substantially −60° C. and 0° C. of a monomeric component containing at least 75% vinylchloride in the presence of a redox-catalyst system consisting essentially of a tetraalkyl lead, a tetravalent-cerium salt and a solvent for said salt, in which the polymerization reaction is terminated at a predetermined degree of conversion of said monomeric component to polymer by introducing into the reaction mass between 0.001 and 5 parts by weight per 100 parts by weight of said monomeric component of at least one peroxydic polymerization-stopping agent having the general formula

where R is selected from the group consisting of hydrogen, alkyl, aralkyl, cycloalkyl and alkyl derivatives of cycloalkyl radicals and their α-hydroxy, α-hydroperoxy, α-alkylperoxy and halide derivatives; aryl-halide, acyl and aroyl radicals and their halide derivatives; and alkyloxycarbonyl, aryloxycarbonyl, alkylidene, heterocyclic and alkenylic radicals.

---

This application is a continuation-in-part of our copending application Ser. No. 444,811 filed Apr. 1, 1965, and entitled "Process for the Production of Polyvinyl Chloride With High Stereoregularity."

The present invention relates to the polymerization of vinylchloride to form homopolymers and copolymers thereof with a high degree of stereoregularity and, more particularly, to the low-temperature production of polyvinyl chlorides with a high crystalline character and to a method of terminating the polymerization process at any desired point.

There have been many processes proposed for the polymerization of vinylchlorides and most of these earlier processes are carried out at a relatively high temperature (e.g., about 50° C.) such that upon attainment of the desired degree of conversion of the monomeric component to the polymer, the reaction mass is rapidly cooled in order to avoid postpolymerization and the unreacted monomer is then recovered. In instances in which postpolymerization of amounts of monomer physically retained in the polymer is to be avoided, as in cases in which the polymer must be prepared with precise properties which are alterable by such postpolymerization, the reaction mixture is added to a polymerization-terminating medium or a polymerization-terminating agent is supplied to the reaction medium.

Low-temperature polymerization methods for the production of vinylchloride polymers and copolymers have gained prominence as a consequence of the high degree of crystallinity and stereoregularity of the resulting polymers and their highly advantageous physical and chemical properties as well as their uniformity. It has not been possible, however, to employ those techniques which have become conventional in higher-temperature-polymerization methods for the termination of the polymerization reactions at the low temperatures (generally less than 0° C.) characterizing low-temperature polymerization. For one thing, rapid cooling of the reaction mass is not practical and indeed is generally ineffective. Furthermore, systems involving the heating of the polymer to drive out the monomer by evaporation have proved even more disadvantageous because the higher temperatures promote postpolymerization and severe alteration of the properties of the resulting polymer. Thus, on the one hand, postpolymerization of occluded monomer is even more deleterious with respect to the quality of the polymer produced in low-temperature systems which are resorted to precisely because of the desirable characteristics to be expected from the method and, on the other hand, prior-art methods of terminating rapidly the polymerization process have failed to be effective at the conditions utilized for low-temperature polymerization.

In the copending application mentioned above, we have described a particularly satisfactory low-temperature polymerization process which is characterized by a high rate of polymer production as well as a high degree of stereoregularity and crystalline qualities as represented by its syndiotactic index and with which prior-art methods of terminating the polymerization at a predetermined point in the conversion of the monomer to the polymer have been found to be ineffective. In the improved process, the polyvinyl-chloride polymers and copolymers are produced in the presence of a redox (reduction-oxidation) catalytic system including at least one ceric-based oxidizing substance and at least one organometal compound of a metal from group IV(A) of the Periodic Table, long form (Handbook of Chemistry and Physics, 41 Edition; Chemical Rubber Publishing Company, Ohio, pages 448, 449) and preferably selected from the group consisting of germanium, tin and lead. According to this development, as described in our copending application, the organometal compound has the general formula

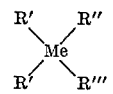

where Me is the metal (i.e., germanium, tin or lead), and each R′ represents an organic radical selected from the group consisting of aralkyl, cycloalkyl, aryl and alkyl radicals; R″ and R‴ may be the same or different and represent single-valence groups such as aralkyl, cycloalkyl, aryl and alkyl radicals or polar members such as a halogen ion, nitrate (NO₃⁻), alkoxy and carboxyl groups and the like; R″ and R‴ can also represent individual valences of a divalent group (e.g., SO₄⁼). The oxidizing agent of this catalyst system is a ceric compound, i.e. includes tetravalent cerium, and it is preferred that the organometallic compound constitute the sole reducing agent present with the ceric-derivative oxidizing agent in the reaction system at least during the polymerization operation and prior to the termination thereof. It has been observed that this catalyst system is highly effective and active at temperatures which reduce the polymerization rate of conventional redox systems and we have found that best results are obtainable by using tetraorganometallic derivatives of tin and lead, the most satisfactory compound being the tetramethyl, tetraethyl, tetrabutyl and tetraphenyl compounds of these metals, e.g., $(C_4H_9)_4Sn$, $(C_6H_5)_4Sn$, $(CH_3)_4Pb$ and $(C_2H_5)_4Pb$. Suitable ceric compounds are the ceric salts which are soluble in the polymerization medium and include ceric nitrate, ceric sulfate, ceric ammonium sulfate, ceric ammonium pyrophosphate, ceric ammonium nitrate, ceric iodate and ceric perchlorate. These organometal derivatives and ceric compounds may be used individually or in mutual admixture and we have discovered, in connection with this polymerization system, that best results are obtained when the cerium-containing oxidizing agent is an ammonium-containing ceric salt of a strong inorganic acid such as sulfuric, nitric or pyrophosphoric acid. The monomeric system subjected to polymerization in accordance with this method should consist at least 75% by weight of vinylchloride and possibly monomers capable of polymerization with vinylchloride to the limited extent indicated are those compatible with vinylchloride, including acrylonitrile and vinylacetate. The reaction is preferably carried out in the presence of a solvent containing hydroxyl groups, ether linkages and the like. Suitable solvents of this type include methanol, ethanol, dioxane, tetrahydrofurane and acetonitrile.

Most advantageously, the polymerization system contains from 0.01 to 3 parts by weight of the organometallic compound or compounds mentioned above and from 0.001 to substantially 1 part by weight (in terms of metallic cerium) of the ceric salt per 100 parts by weight of the monomeric component (containing at least 75% by weight vinylchloride). Such a system has been found to produce polymers with a high degree of crystallinity and stereoregularity with syndiotactic indices (IS) between 2 and 2.8, depending upon the polymerization temperature. Moreover, the products have molecular weights ranging from substantially 20,000 to 200,000 and have been perfectly suitable for use in films and fibers as well as in the container industry, for tubes and manufactured goods resistant to attack by boiling water and chlorinated solvents and, as a rule, all substances capable of swelling conventional polyvinyl chlorides.

It will be understood that the system described above and constituting the subject of our copending application Ser. No. 444,811 distinguishes over prior methods of polymerizing unsaturated monomeric components using cerium salts and other reducing agents than the tetraorganometal compounds specifically described. In such prior systems, the polymerization is carried out at temperatures far in excess of those in which our improved system is capable and the use of reducing agents such as hydroquinone, sodium sulfite and ferrous sulfate is substantially ineffective to stop the polymerization reaction at temperatures well below the room temperature or higher temperatures used with conventional systems. A stopping agent for the low-temperature improved polymerization method must be capable of acting at temperatures well below 0° C. and, generally, less than −20° C. In fact, the improved catalytic system of our copending application operates most effectively at temperatures as low as −40° to −60° C. Furthermore, the conventional stopping agents, which are adapted to perform at temperatures above 20° C. and fail completely at temperatures below zero ° C., give rise to the presence of undesirable residues in the product and are capable of detrimentally coloring the polymer and altering its thermostability. Such deleterious effects are absolutely inadmissible when the product is to be used as a film-forming or fiber-forming substance.

It is, therefore, an important object of the present invention to provide an improved low-temperature polymerization method for the production of vinylchloride polymers of high stereoregularity which can be carried out, without the disadvantages of prior polymerization-halting techniques, to any desired degree of conversion of a monomeric component to the polymer.

A further object of this invention is to extend the principles set forth in our copending application Ser. No. 444,811 to a method of producing vinylchloride polymers with excellent control of the termination of the polymerization reaction and thus the degree of monomer conversion without reducing the quality of the polymer which is produced, or giving rise to undesirable contamination thereof.

Yet another object of this invention is to provide an improved method of terminating low-temperature polymerization reactions utilizing catalyst systems containing tetravalent-cerium compounds and organometallic derivatives of germanium, tin or lead.

These objects and others which will become apparent hereinafter are attained, in accordance with the present improvement, in a method of polymerizing a monomeric component, in accordance with our copending application Ser. No. 444,811, which further includes the step of terminating the reaction at a predetermined degree of conversion of the monomeric component to the polymer by treating the reaction mixture with a peroxide-type compound of the general formula:

$$R\text{—}O\text{—}O\text{—}H$$

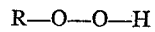

where R may be selected from the group consisting of hydrogen, alkyl, aralkyl, cycloalkyl, alkyl-substituted cycloalkyls (cycloalkyl alkyls), and their α-hydroxy, α-hydroperoxy, α-alkylperoxy and halide derivatives; R may also be drawn from the class of arylhalides and acyls or aroyls (e.g., benzoyls) and their halide derivatives; and aryloxycarbonyl (e.g., benzoxycarbonyl) alkylidene, heterocyclic alkenyl radicals and the like.

It has been found that best results are obtainable with low-molecular-weight peroxides, such as hydrogen peroxide, alkyl hydroperoxides of low carbon number (e.g., tertiary-butyl hydroperoxide), aralkyl hydroperoxides (e.g., cumyl hydroperoxide), and ketone peroxides (e.g., cyclohexanone peroxide).

Surprisingly, compounds of this nature are effective to terminate a polymerization reaction at low temperature even though, and in spite of the fact that, such compounds have hitherto been proposed as free-radical polymerization initiators capable of catalysis of a polymerization reaction in their own right. Thus, it has been found, totally unexpectedly, that compounds of this type can be used to stop short a low-temperature polymerization reaction catalyzed by the redox systems of our copending application mentioned above at any desired degree of conversion of monomeric component to the polymer. We have also discovered that such agents are also effective as bleaches and act upon the polymer obtained in the reaction to whiten same and remove any traces of coloration derived from the use of the ceric salt. By contrast with earlier systems using cerium-containing catalysts, the product obtained from the process of the present invention is white or substantially white and contains none of the coloring matter usually entrained in the polymer and retained thereby through numerous washings. Furthermore, the present method provides the ability to terminate the polymerization reaction without the production of undesirable polymers when thermal control of the reaction is lost and thus permits the recovery of unreacted monomer and nondepleted catalyst.

According to a more specific feature of this invention, the pH of the reaction mixture is maintained at a value no greater than 4, an upper limit which has been found to be critical for the proper operation of the stopping agent. Thus, the present invention provides, when necessary, for the addition with the stopping agent to the reaction medium or mixture of a substance (e.g., an inorganic acid or an acidic salt) capable of lowering the pH.

We have found that best results are obtained when, working with catalyst systems as set forth in our copending application Ser. No. 444,811, the stopping agent is added to the reaction mixture at the time the termination of polymerization is required in an amount ranging between 0.001 and 5 parts by weight per 100 parts by weight of vinylchloride or monomeric component containing same introduced into the reaction system. A preferred quantity of the stopping agent is about 0.1% by weight of the vinylchloride component.

It has been found that exceptionally good results are obtainable from the point of view of catalyst efficiency, rate of production and quality of polymer when the two components of the catalyst system are tetraethyl lead [Pb(C₂H₅)₄] and diammonium ceric hexanitrate $$(NH_4)_2CeNO_3)_6$$

this latter component being dissolved in a solvent, able to keep in solution the active species of the catalytic system; the catalyst components being added separately to the vinylchloride containing monomeric component. The reaction mixture is permitted to polymerize with continuous stirring and, after the predetermined degree of polymerization has been attained, the indicated quantity of one or more of the aforedescribed stopping agents, having the general formula R—O—O—H, is added rapidly to the mixture with or without dilution of the stopping agent by a solvent miscible with the reaction medium. Such a solvent can include one or more of the solvents described as serving as the vehicle for the catalyst system in the polymerization reaction. Stirring of the mass is continued and it is observed that the entire mass experiences a whitening or lightening of color and shortly turns perfectly white. The polymer can then be recovered in the usual manner, e.g. by filtering, washing and drying under vacuum at a temperature of about 50° C.

Polymers prepared in this manner have a high degree of crystallinity and stereoregularity with syndiotactic indices ranging between 2 and 2.8, as previously mentioned. The syndiotactic index IS a measure of the stereoregularity of vinylchloride polymers and is determined as indicated in Chimica é l'Industria, volume 46, pp. 166–171, 1964, according to measurement of the infrared spectrum of the polymer; in the polyvinyl chloride infrared spectrum the stereoregularity in the macromolecular chain produces its strongest effects in the region from 600 to 700 cm.⁻¹ where there are two bands of particular significance at 635 cm.⁻¹ and 692 cm.⁻¹. For this reason, the ratio of absorption intensities I (635 cm.⁻¹)/I (692) cm.⁻¹) of these bands is indicated as the IS value (syndiotactic index) and is taken as an indication of the relative amount of the syndiotactic fraction of the polymer. The measurements are experimentally obtained by dissolving the polymer in cyclohexanone at about 120° C. for 15 min. to yield a solution of 0.8 to 1% by weight of polymer. The solution is quickly cooled and evaporated at about 50° C. under a reduced pressure of 10 mm. Hg on a flat glass surface. Films are obtained having a thickness of about 20–30 microns and are subjected to I-R analysis in a Perkin-Elmer spectrophotometer (Mod. 21) at double radius with a potassium-bromide prism.

The molecular weights of the polymers are determined by the method explained in Chimica é l'Industria, volume 36, pp. 883–889, 1954, from the intrinsic viscosity of a solution of the polymer. Thus the intrinsic viscosity is measured at 25° C. for solutions of the polymer is cyclohexanone at a concentration of 0.1% by weight. The equation which relates the molecular weight of the polymer to its intrinsic viscosity is the following:

$$\nu = 2.4 \times 10^{-4} \overline{M}n^{0.77}$$

wherein $\nu$ is the intrinsic viscosity in $dl/gr$ and $\overline{M}n$ is the numerical average molecular weight. The molecular weight was found to range between 20,000 and 200,000 and the polymer was found to be perfectly white. The polymers were excellent for use in fibers and films, were resistant to attack by boiling water and chlorinated solvents which were capable of swelling conventional polyvinyl chlorides.

The following specific examples illustrate the principles of the present invention:

Example I

A 1-liter glass flask fitted with a stirrer, a thermometer and an inlet pipe for nitrogen, after complete displacement of the air with dry nitrogen, is supplied with 500 grams of anhydrous vinylchloride, 3.2 cc. of tetraethyl lead Pb(C₂H₅)₄, and a solution of 0.9 gram of ceric ammonium nitrate (NH₄)₂Ce(NO₃)₆ in 120 cc. of methanol.

Polymerization was carried out at −40° C. and 2 hours and 45 minutes from the start of polymerization a solution of 0.4 cc. of a 35% hydrogen peroxide and of 0.3 cc. of concentrated HNO₃ (pH reducer) in 30 cc. of methanol was introduced into the reaction flask. The reaction mass was then stirred further for 5 minutes in order to ensure the diffusion of reactants. Immediately a change in color of the reaction mass was observed and the mass became perfectly white. Still under a nitrogen atmosphere samples were withdrawn and treated as described below:

A first sample or specimen (A) was immediately filtered with care to avoid all such causes as might induce a post-polymerization at a temperature higher than −40° C. A sample (B) was put into a thermostat-controlled bath at +40° C. and kept under stirring for 10 minutes, allowing the vinylchloride monomer to evaporate. Another sample (C) was treated like sample (B), but under the same stirring conditions for one hour in the thermostatically controlled bath at +40° C. A further sample (D) was brought to −15° C. and kept there for 1 hour under stirring. At the lapse of these periods, the four samples were filtered, washed with methanol, dried and weighed.

For the purpose of comparison, the same procedure was repeated but without the stopping agent (hydrogen peroxide).

In the following Table I for each sample are recorded the conversion degrees, the molecular weight as determined by the above-described viscosimetric measurements and syndiotactic index IS, both for the samples stopped by the stopping agent as well as for the unstopped ones.

TABLE I

| Sample | Conversion Percent of Monomer | Molecular Weight | IS |
|---|---|---|---|
| (A) Stopped | 5.51 | 80,000 | 2.4 |
| (A) Unstopped | 5.59 | 80,000 | 2.4 |
| (B) Stopped | 5.56 | 79,000 | 2.4 |
| (B) Unstopped | 6.87 | 71,000 | 2.3 |
| (C) Stopped | 5.57 | | |
| (C) Unstopped | 6.93 | | |
| (D) Stopped | 5.51 | | 2.4 |
| (D) Unstopped | 7.10 | | 2.3 |

By comparing the conversion degree attained for the various samples it will be seen that for those to which has been added hydrogen peroxide there is practically no postpolymerization phenomenon (increase consumption of monomer), neither at −15° C. nor at +40° C. while, for the samples to which no hydrogen peroxide has been added, considerable postpolymerization takes place.

Moreover it is noticed that, while for the samples treated with hydrogen peroxide the molecular weight and the syndiotactic index remain constant, for the samples not treated with hydrogen peroxide there is a considerable variation of these characteristics owing to postpolymerization at temperatures higher than −40° C.

Example II

Example I was repeated by adding, however, instead of hydrogen peroxide, after 3 hours from the start of polymerization at −40° C., 0.75 gram of cumyl-hydroperoxide in 25 cc. of methanol.

Five samples were taken, four of which (A, B, C and D) were treated according to the procedure described in the preceding example, while the fifth sample (E) was kept under stirring for 2 hours at −40° C.;

after this treatment the sample was filtered, washed, dried and weighed.

The following Table II records the results (conversion in percent) for the five samples in the described test and for another five samples (unstopped) in a comparative test carried out in parallel with the first group with the only difference that no use was made of the cumyl hydroperoxide (stopped samples).

TABLE II

| Sample | Conversion percent |
|---|---|
| (A) stopped | 6.60 |
| (A) unstopped | 6.51 |
| (B) stopped | 6.62 |
| (B) unstopped | 7.92 |
| (C) stopped | 6.58 |
| (C) unstopped | 7.95 |
| (D) stopped | 6.65 |
| (D) unstopped | 8.05 |
| (E) stopped | 6.57 |
| (E) unstopped | 8.87 |

Also in this case the comparison of the conversion degrees for the various stopped and unstopped samples will clearly show the effectiveness of the cumyl hydroperoxide as stopping agent for the polymerization, which is active even at temperatures as low as −40° C.

EXAMPLE III

The method of Example 1 was followed by introducing into a 1-liter flask 500 grams of vinylchloride, 0.80 gram of cerium ammonium sulphate dissolved in 200 cc. of methanol and 3.2 cc. of $Pb(C_2H_5)_4$; the polymerization was carried out at −30° C. One hour after the start of the polymerization, 2.2 cc. of a 50% solution of cyclohexanone peroxide in dimethylphthalate, diluted with 20 cc. of methanol were introduced into the flask. The reaction mass was then stirred for about 5 minutes. Thereupon 4 "stopped" samples (A, B, C and D) of the reaction mixture were taken and treated as described in Example I.

The following Table III records the results obtained compared to those obtained in a parallel test in which, however, no cyclohexanone peroxide was added (unstopped samples A, B, C and D).

TABLE III

| Sample | Conversion percent |
|---|---|
| (A) stopped | 2.87 |
| (A) unstopped | 2.95 |
| (B) stopped | 2.95 |
| (B) unstopped | 4.17 |
| (C) stopped | 2.93 |
| (C) unstopped | 4.25 |
| (D) stopped | 2.85 |
| (D) unstopped | 4.46 |

This table also shows the effectiveness of the cyclohexanone peroxide as a stopping agent and its capacity to avoid, to the highest degree, postpolymerization phenomena.

Example IV

Polymerization was carried out under the same conditions as in Example I. After one hour from the start of the polymerization 0.6 cc. of tertiary-butylhydroperoxide, diluted with 20 cc. of methanol, was introduced into the polymerization mass. After 5 minutes of constant stirring 4 "stopped" samples (A, B, C and D) of the reaction mixture were taken and treated as described in Example No. 1.

In the following Table IV are recorded the results obtained compared to those obtained in a parallel test with "unstopped" samples (A, B, C and D) not treated with tertiary-butylhydroperoxide.

TABLE IV

| Sample | Conversion percent |
|---|---|
| (A) stopped | 2.01 |
| (A) unstopped | 2.10 |
| (B) stopped | 2.05 |
| (B) unstopped | 3.20 |
| (C) stopped | 2.03 |
| (C) unstopped | 3.23 |
| (D) stopped | 2.00 |
| (D) unstopped | 3.82 |

From this data the effectiveness of the tertiary-butylhydroperoxide as a polymerization-stopping agent active at low temperatures will be readily apparent.

Example V

Into a small 500-cc. polymerization autoclave, 212 grams of vinylchloride were fed after first having displaced the air with nitrogen. Thereupon 0.37 gram of $(NH_4)_2Ce(NO_3)_6$, dissolved in 50 cc. of methanol, 1.35 cc. of $Pb(C_2H_5)_4$ and 0.16 gram of cumyl hydroperoxide were also added. The mixture was then brought to a temperature of 30° C. and kept under constant stirring at 30° C. for one hour.

It was seen that there was no trace of any polymerization. For purposes of comparison, into another autoclave, identical with the aforementioned one, the same reactants in the same quantities as mentioned above, excluding however the cumyl-hydroperoxide, were introduced. At +30° C. there was a very rapid polymerization, so much so that after one hour 15.1 grams of polymer were obtained, which meant a conversion of 7.1%.

Example VI

It was operated as in Example V by replacing, however, the cumyl hydroperoxide with 0.16 cc. of a 10% by weight of hydrogen peroxide aqueous solution. Also in this case at +30° C. no polymerization took place.

We claim:
1. A process for the production of vinylchloride polymers and copolymers by the polymerization at a temperature between substantially −60° C. and 0° C. of a monomeric component containing at least 75% vinylchloride in the presence of a redox-catalyst system consisting essentially of a tetraalkyl lead, a tetravalent-cerium salt and a solvent for said salt, the improvement which comprises the step of terminating the polymerization reaction at a predetermined degree of conversion of said monomeric component to polymer by introducing into the reaction mass between 0.001 and 5 parts by weight per 100 parts by weight of said monomeric component of at least one peroxydic polymerization-stopping agent having the general formula

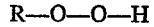

where R is selected from the group consisting of hydrogen, alkyl, aralkyl, cycloalkyl and alkyl derivatives of cycloalkyl radicals and their α-hydroxy, α-hydroperoxy, α-alkylperoxy and halide derivatives; aryl-halide, acyl and aroyl radicals and their halide derivatives; and alkyloxycarbonyl, aryloxycarbonyl, alkylidene, heterocyclic and alkylenylic radicals.

2. A process for the production of vinylchloride polymers and copolymers by the low-temperature polymerization of a vinylchloride-containing monomeric component in the presence of a redox-catalyst system, comprising the steps of:

terminating the polymerization reaction at a predetermined degree of conversion of said monomeric component to polymer by introducing into the reaction mass, upon the attainment of said degree of conversion and in an amount ranging between 0.001 and 5 parts by weight per 100 parts by weight of said monomeric component, at least one peroxidic polymerization-stopping agent having the general formula

where R is selected from the group consisting of hydrogen, alkyl, aralkyl, cycloalkyl and alkyl derivatives of cycloalkyl radicals and their α-hydroxy, α-hydroperoxy, α-alkylperoxy and halide derivatives; arylhalide, acyl and aroyl radicals and their halide derivatives; and alkyloxycarbonyl, aryloxycarbonyl, alkylidene, heterocyclic and alkenylic radicals; and maintaining the pH of the reaction mass below about pH 4 at least at introduction of said agent into said mass, said redox-catalyst system including at least one organometallic compound having the structural formula

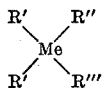

wherein Me is a metal selected from the group consisting of germanium, tin and lead, R' represents an organic radical selected from the group consisting of aralkyl, cycloalkyl, aryl and alkyl radicals, and R" and R'" represent individual valences of functionalities selected from the group consisting of aralkyl, cycloalkyl, aryl and alkyl radicals and monovalent and divalent polar substituents; said redox-catalyst system further comprising at least one tetravalent-cerium compound selected from the group consisting of ceric nitrate, ceric sulfate, ceric ammonium nitrate, ceric ammonium sulfate, ceric ammonium pyrophosphate, ceric iodate and ceric perchlorate; said reaction mass further comprising at least one organic solvent for said redox catalyst, said polymerization-stopping agent being introduced into said mass in a vehicle miscible with said solvent, the polymerization reaction being carried out at a temperautre between substantially 0° C. and −60° C. said monomeric component consisting of at least 75% by weight vinyl chloride.

3. The process defined in claim 2 wherein said agent is hydrogen peroxide.

4. The process defined in claim 2 wherein said agent is cumyl hydroperoxide.

5. The process defined in claim 2 wherein said agent is tertiary-butylhydroperoxide.

6. The process defined in claim 2 wherein said agent is cyclohexanone peroxide.

7. The process defined in claim 2 wherein said tetravalent-cerium compound is present in said reaction mass at least initially in an amount ranging between substantially 0.001 and one part by weight, in terms of metallic cerium, per 100 parts by weight of said monomeric component and said organometallic compound is present in an amount at least initially of substantially 0.01 and 3 parts by weight per 100 parts by weight of said monomeric compound, said stopping agent being added to said reaction mass in an amount of the order of about 0.1% by weight of said monomeric component for terminating the polymerization reaction, the pH of said mass being reduced to a maximum of pH 4 by the addition jointly with said polymerization-stopping agent of at least one acid or acidic salt to the reaction mass.

8. The improvement defined in claim 1 wherien said polymerization-stopping agent is cumyl-hydroperoxide.

References Cited
UNITED STATES PATENTS

| | | | |
|---|---|---|---|
| 3,084,143 | 4/1963 | Hieserman et al. | 260—92.8 |
| 2,662,878 | 12/1953 | Bryant | 260—92.8 |
| 2,922,768 | 1/1960 | Mino et al | 260—94.3 |

JOSEPH L. SCHOFER, *Primary Examiner.*

J. A. DONAHUE, *Assistant Examiner.*